United States Patent [19]

Shaw et al.

[11] Patent Number: 5,233,798
[45] Date of Patent: Aug. 10, 1993

[54] ENABLING ASSEMBLY

[76] Inventors: Clive A. Shaw; Hazel Shaw, both of 703 8th St., Kenedy, Tex. 78119

[21] Appl. No.: 665,280

[22] Filed: Mar. 6, 1991

[51] Int. Cl.[5] .................. E04B 1/343; E04B 1/348; E04B 1/32
[52] U.S. Cl. .................. 52/64; 273/153 S; 428/116; 52/806; 52/763; 52/86; 52/311.2
[58] Field of Search .......... 52/2.13, 2.18, 2.23, 52/64, 80, 309.1, 311, 384, 404, 763, 806; 446/125; 273/153 S; 428/45, 49, 116

[56] References Cited

U.S. PATENT DOCUMENTS

| 278,571 | 5/1883 | Mackenzie | 273/153 S |
|---|---|---|---|
| 471,941 | 3/1892 | Brown | 273/153 S |
| 644,138 | 2/1900 | Ketchum | 52/584 X |
| 807,113 | 12/1905 | Dyer | 273/153 S |
| 1,296,359 | 3/1919 | Brown | |
| 1,708,462 | 4/1979 | Bodman | 52/577 |
| 1,708,462 | 4/1929 | Stewart | 52/396 |
| 2,538,330 | 1/1951 | Rosenhagen | |
| 2,919,549 | 1/1960 | Haworth et al. | |
| 2,968,456 | 1/1961 | Hanson | 52/808 X |
| 3,676,976 | 7/1972 | McAllister | 52/2.15 X |
| 3,892,898 | 7/1975 | Yasui | 428/116 |
| 4,068,429 | 1/1978 | Moore | 52/309.17 X |
| 4,150,175 | 4/1979 | Huettemann | 52/806 X |
| 4,599,254 | 7/1986 | Cuttica | 52/384 X |
| 4,743,578 | 5/1988 | Davidson | 502/439 |
| 4,756,943 | 7/1988 | Koletzko | 52/806 X |
| 4,970,839 | 11/1990 | Lavi | 52/311 |
| 5,036,635 | 8/1991 | Lalvani | 52/80 |

FOREIGN PATENT DOCUMENTS 0245004 12/1925 United Kingdom ............ 273/153 S

Primary Examiner—Carl D. Friedman
Assistant Examiner—Robert Canfield
Attorney, Agent, or Firm—Richard C. Litman

[57] ABSTRACT

Disclosed is an enabling assembly which may be used for a variety of purposes, including walls, room partitions, signs, arched supports, game boards and puzzles, the assembly including a plurality of interlocking pillow elements surrounded by a frame and mounting a plurality of facing elements in a manner enabling the facing elements, if not fixed, to be shifted so as to change the patterns thereon, the facing elements each having a connecting shaft disposed in the interstices between the pillow elements, the facing elements and connecting shafts being movable to momentarily separate the pillow elements so as to enable the facing elements to shift from one interstice to another interstice selectively. The frame includes parking slots where unused facing elements may be stored, or in the alternative, where one or more facing elements may be parked to provide room to move the remaining facing elements.

17 Claims, 4 Drawing Sheets

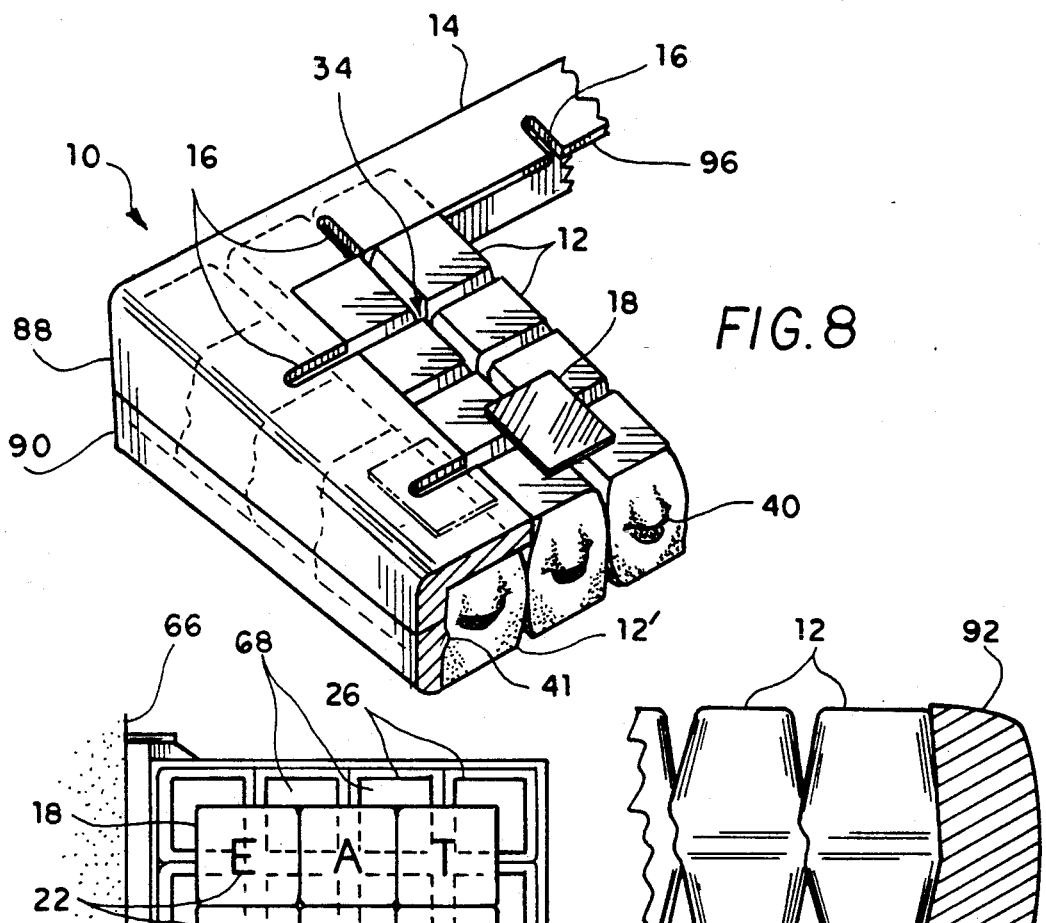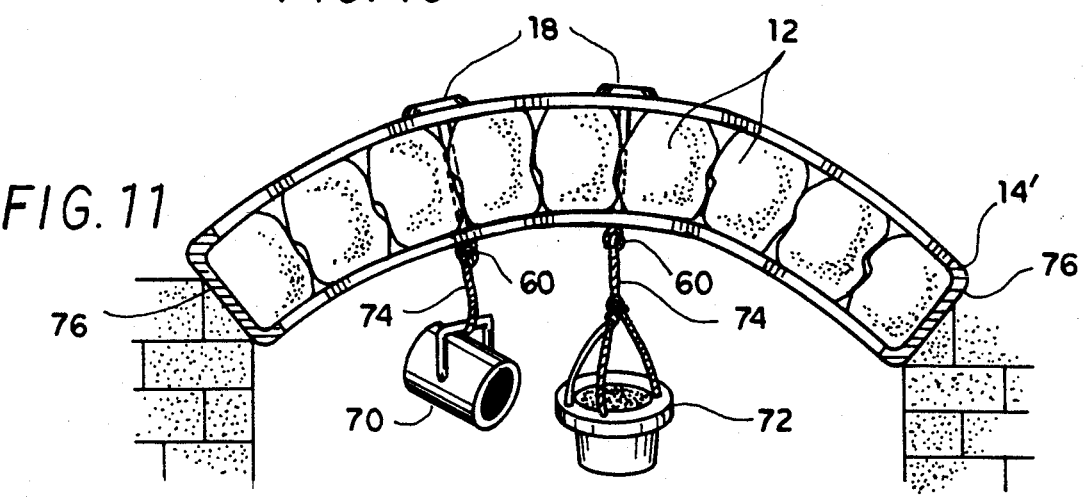

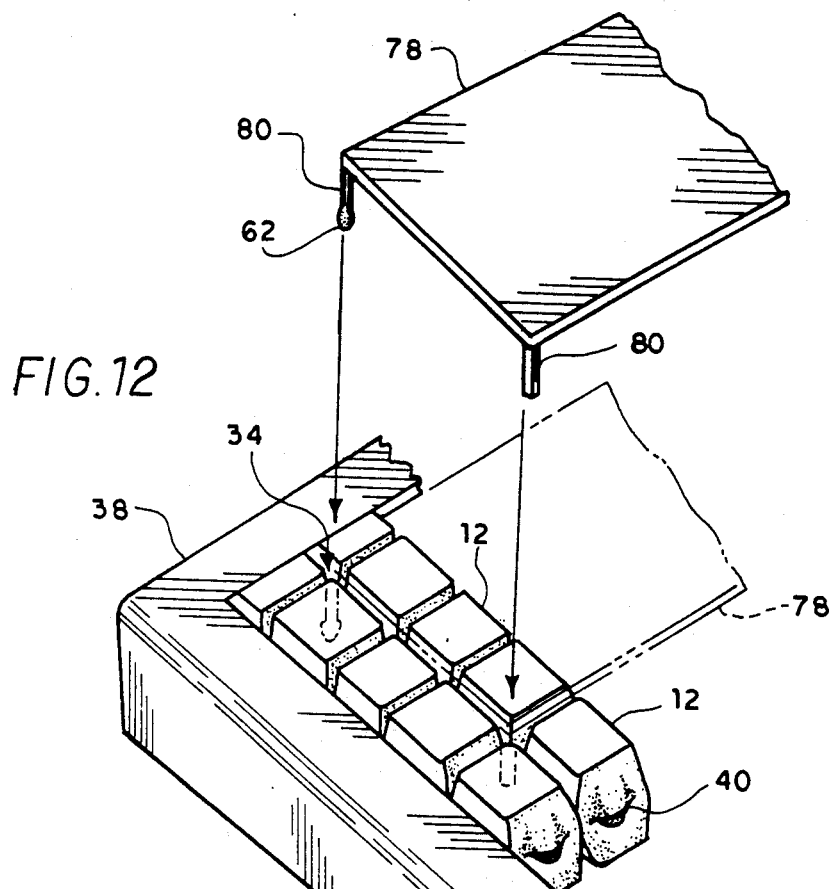
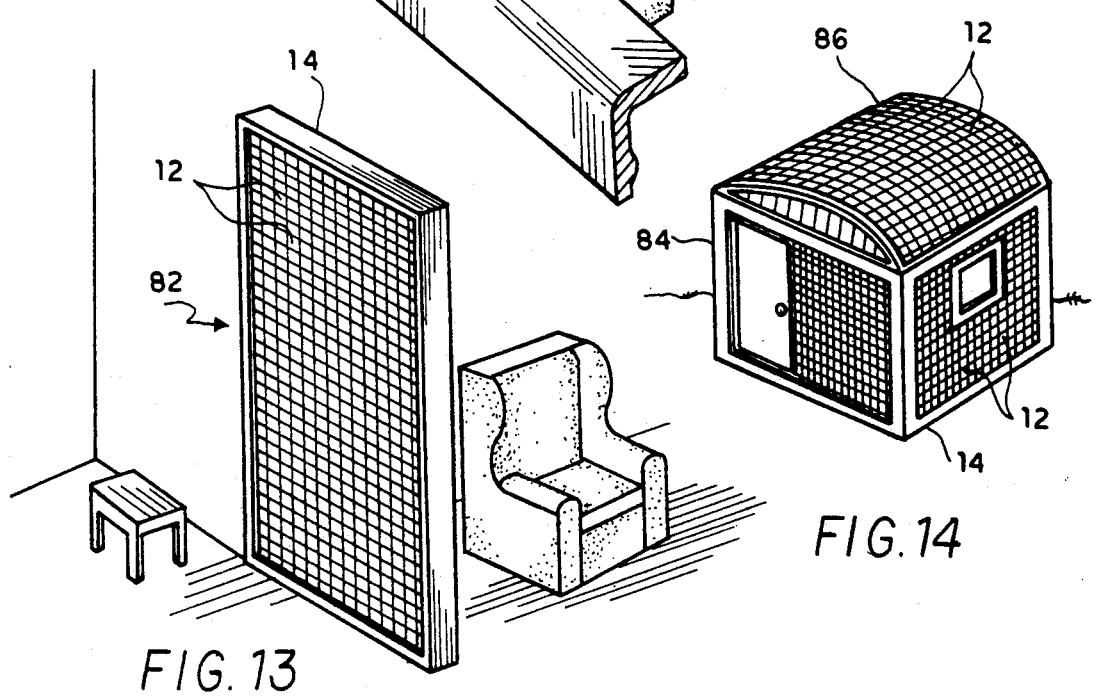
FIG. 12
FIG. 13
FIG. 14

ENABLING ASSEMBLY

FIELD OF THE INVENTION

This invention relates to a framed assembly comprising a closely packed array of similar pillows, sleeves or collars contained within a frame to provide a unit having a surface (or surfaces when double-sided) containing tracks along, across, through, around and between which suitably shaped discs, tiles, pieces or hangers (all utilizing sticks, pins or struts) may be moved from any interstice or junction in the assembly to any other interstice or junction without being removed or detached from the frame assembly. The assembly may also be sheathed using removable sheathing components.

BACKGROUND OF THE INVENTION

Supports for the mounting of tiles and the like are known. U.S. Pat. No. 2,135,118 issued to Andrew H. Stewart discloses an arrangement wherein the tiles are provided with knobs which may be detachably inserted into openings in a wall or the like. There is no provision in Stewart of tracks whereby the tiles may be moved without detaching them from the frame assembly. Similarly U.S. Pat. No. 2,919,549 issued to Lionel Haworth and Ralph John Shire discloses an arrangement wherein tiles having feet are mounted on a supporting frame by passing the stems thereof through pre-formed holes in the supporting frame. There is no provision in Haworth et al. for moving the tiles without detaching them from the supporting frame.

It is also known to slidably mount tiles on a wall surface whereby the mosaic pattern may be changed as desired. U.S. Pat. No. 4,599,254 issued to Angelo Cuttica discloses a cabinet having at least one wall with tiles mounted slidably thereon by means of tongue-and-groove connections. One of the tiles is removably mounted by means of screws and carries a handle. When it is desired to change the pattern, the handle tile is removed, creating a space permitting the remaining tiles to slide into different positions.

It is also known to enclose a plurality of tubes or the like within a frame in a honeycomb fashion. Reissue U.S. Pat. No. Re. 24,558 issued to Andrew Tyree, U.S. Pat. No. 1,296,359 issued to Daniel Webster Brown, U.S. Pat. No. 1,708,462 issued to Walter Bodman and U.S. Pat. No. 2,538,330 issued to J. Rosenhagen are representative examples of such honeycomb arrangements. In each disclosure, adhesive materials are used to retain the tubes or the like in position within the frame.

U.S. Pat. No. 4,068,429 issued to Alvin Edward Moore discloses a wall wherein the honeycomb arrangement is formed of cans. U.S. Pat. No. 4,743,578 issued to Peter Davidson discloses that the tubes or the like forming a honeycomb arrangement may be closed at each end and may be retained within a frame in interlocking fashion, permitting the honeycomb to form an arch. Other disclosures of an arched or domed configuration are found in U.S. Pat. No. 4,150,175 issued to Erik W. Huettemann and U.S. Pat. No. 4,756,943 issued to Wolfram Koletzko. U.S. Pat. No. 2,968,456 issued to Hanson discloses that the tubes or the like forming a honeycomb arrangement may be deformable.

SUMMARY OF THE INVENTION

It is an object of this invention to provide a framed assembly comprising a frame enclosing a plurality of elements interlocked in such a way as to permit tiles to move slidably between interstices so as to change a pattern thereon.

It is another object of the invention to provide a framed assembly which is economical to manufacture and easy to use.

It is another object of the invention to provide a framed assembly which has a variety of uses, including walls, partitions, signs, self-supporting arches, domed roofs, and puzzles.

It is another object of the invention to provide a framed assembly wherein the enclosed elements are formed as resilient or elastic pillows, sleeves or collars, each provided with an ogee or S-shaped profile so as to interlock with adjacent pillows, sleeves or collars while being sufficiently resilient to allow projections from suitably configured tiles to slide therebetween, the tiles having designs or indicia thereon.

The foregoing objects are achieved by providing a peripheral frame tightly enclosing a plurality of pillows, sleeves or collars therein, the pillows, sleeves or collars being formed of any of a number of resilient plastic materials such as nylon and provided with interlocking S-shaped profiles, the resiliency permitting tiles to slide between interstices, or in the alternative, permitting the tiles or sheathing to be mounted on the framed assembly by removably inserting mounting projections into the interstices. The pillows, sleeves and collars may be hollow with thin walls of approximately 10-30 gauge thickness. The hollow sleeves or collars, for example, may be used in forming signs, to allow air to pass therethrough. The peripheral frame may be provided with slots or be grooved, so as to allow selected tiles to be parked, thereby providing a space whereby the remaining tiles may be moved to change the design on the wall, sign or the like. The slots or grooves may also be used to store spare tiles, bearing for example alphanumeric characters for changeable signs or for games.

Other objects, features and advantages of this invention will be apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 3D is a perspective view of a pillow element that can be charged with water or pressurized with gas.

FIG. 8 is a perspective view showing a composite retaining and interlocking frame surrounding the pillow elements, the frame having parking slots allowing selected tiles to be shifted into selected positions.

FIG. 9 is a sectional view showing pillow elements cooperating with an interlocking frame.

FIG. 10 is a view showing a use of the inventive assembly as a sign.

FIG. 11 is a view showing a use of the inventive assembly as a supporting arch or domed supporting assembly.

FIG. 12 is a perspective view showing a use of the inventive assembly as a support for sheathing applied to a wall.

FIG. 13 is a perspective view showing a use of the inventive assembly as a room divider.

FIG. 14 is a perspective view showing a use of the inventive assembly to form building walls and a domed roof.

DETAILED DESCRIPTION OF PREFERRED EMBODIMENTS

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Figure 1:
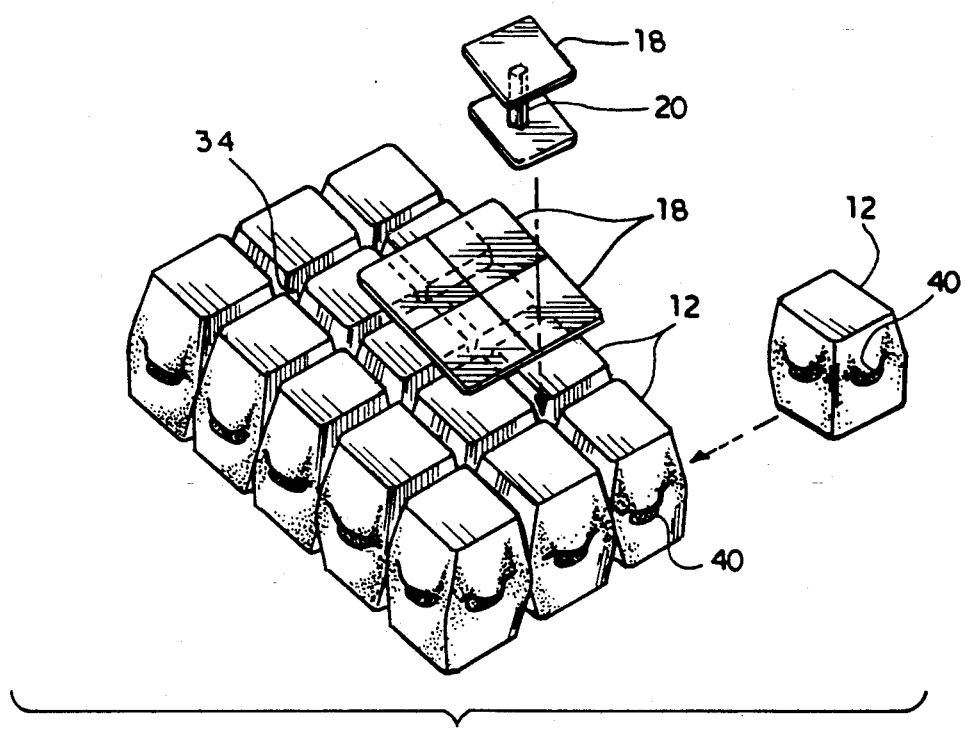
FIG. 1 is a perspective view of a pillow element arrangement cooperating to retain double-sided tiles in position to form an assembly enabling slidable movement of the tiles.

Turning first to FIG. 8, enabling assembly 10 is shown as comprising a plurality of pillow elements 12 tightly held together by a composite frame 14 which surrounds the perimeter of the pillow elements 12. As shown, frame 14 may comprise an upper enclosure or retaining frame 88 and a mating bottom interlocking frame 90. Pillows 12' under the lip 96 of frame 88 are smaller in height than pillows 12, the top surface of pillows 12 being coplanar with the top surface of lip 96. In FIG. 9, an interlocking frame 92 is used alone without an enclosure or retaining frame. Frame 14 contains parking slots 16 around the perimeter. Facing means in the form of face tiles 18, which may be either single faced (FIG. 4) or double faced (FIGS. 1 and 2) have a shaft 20 usually located in the interstices 34 between the pillow elements 12, and may be slidably moved from one interstice 34 to another or into a parking slot 16 either for storage purposes or to provide a space allowing other tiles to be moved. The tiles 18 may be variously colored, have mosaic designs thereon, or carry alphanumeric characters 22 (as shown in FIG. 10).

Figures 3A, 3B, 3C:
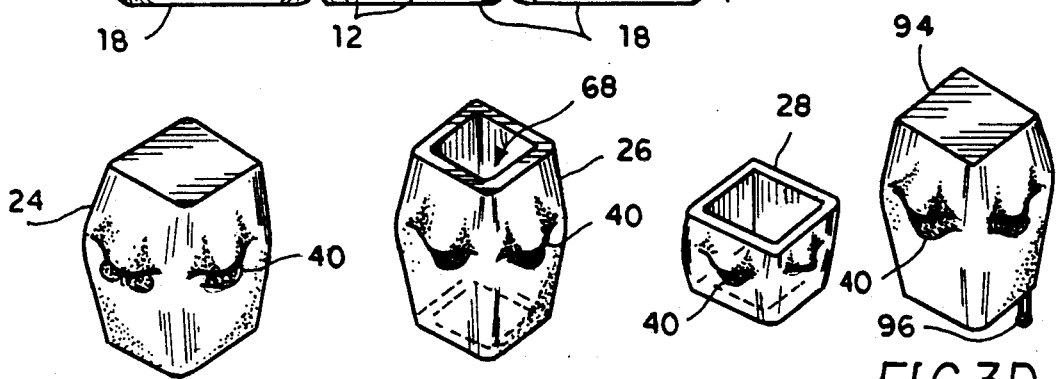
FIG. 3A is a perspective view showing a typical configuration of a pillow element.
FIG. 3B is a perspective view showing an alternative configuration of a pillow element as a hollow sleeve.
FIG. 3C is a perspective view of another alternative configuration of a pillow element as a collar.

Pillow elements 12 are formed from resilient plastics such as nylon, and have a low coefficient of friction. Pillow elements 12 may have a variety of configurations as shown, by way of example only, in FIGS. 3A, 3B, 3C, 3D, 6, 7A and 7B. In FIG. 3A, pillow element 24 is shown to be hollow but solid-ended. In FIG. 3B, pillow element 26 is shown to be tubular, and may be used alone (as shown in FIG. 9) or as a resilient sleeve encasing another element (not shown). Similarly FIG. 3C shows short pillow element 28 as a collar which partially may resiliently encase another element (not shown). In FIG. 3D, pillow element 94 is hollow and is provided with a screw cap or inflater 96 whereby pillow element 94 can be charged with water or pressurized with gas in the event that weight or pressure is required to stabilize or strengthen the assembly of which it forms a part. In FIG. 7A, pillow elements 54 have a triangular configuration, while in FIG. 7B, pillow elements 46 are shown to be cylindrical in configuration. Also shown in FIGS. 7A and 7B are representative interstices 30 and 32 formed between cooperating pillow elements such as pillow elements 54 and 46, respectively, forming a space for shaped tile shafts 20' and 20''. In FIG. 7A, shaft 20' is hexagonal in cross section while in FIG. 7B, shaft 20'' is triangular in cross section.

Figure 2:
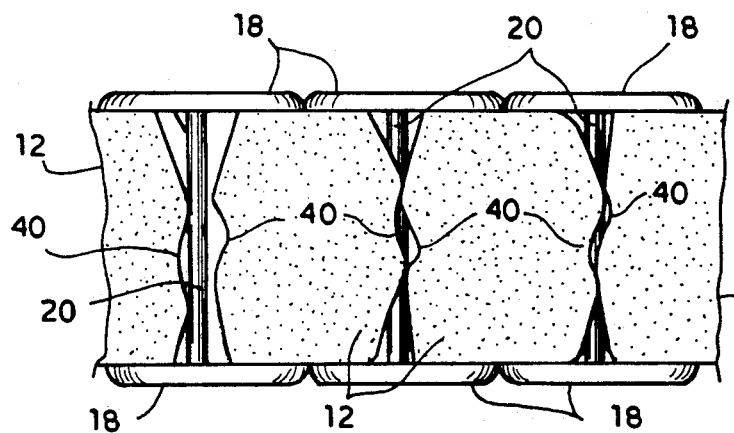
FIG. 2 is a side view showing how the pillows are interlocked, and also how a selected tile may be moved from one position to another relative to the pillows.

Pillow elements 12 are interlocked by means of ogee or "S" curves 40 formed in the body of elements 12 on the sides thereof as shown, for example, in FIGS. 2, 4, 5, 9 and 11. The surrounding frame such as frame 14, which may have a corresponding ogee or "S" curve 41, retains elements 12 sufficiently packed together to prevent the elements 12 from falling out of the frame 14 by the interlocking of curves 40, yet the resiliency of elements 12 allows shaft 20 to pass between elements 12 when moved from one interstice to another, as shown in FIG. 2.

Figure 5:
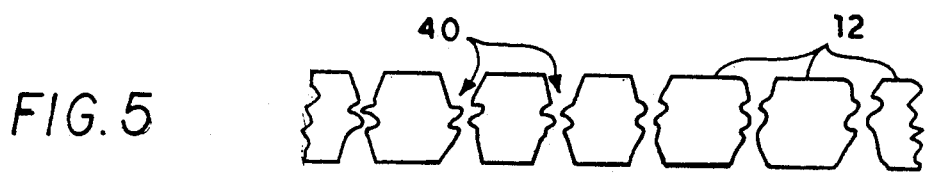
FIG. 5 is a view showing the ogee interlocking pattern.

In FIG. 5, the ogee pattern is achieved by inverting every other pillow 12 such that the ogee or S curves can interfit in interlocking fashion.

Figure 4:
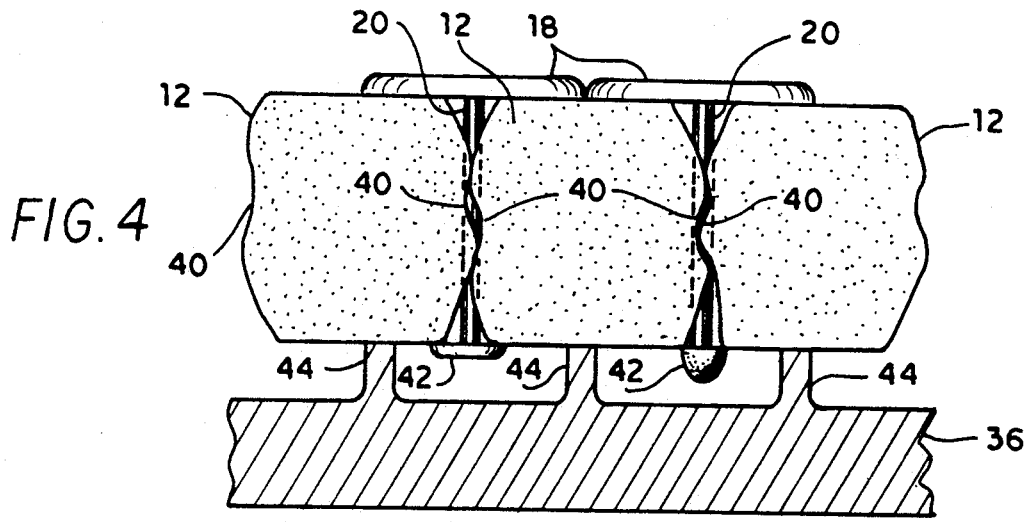
FIG. 4 is a sectional side view showing how single-sided tiles are retained between pillow elements mounted on a supporting frame.

In FIG. 4, a second embodiment using single-sided tiles 18 is shown. Tiles 18 are provided at one end of shaft 20. On the other end of shaft 20 is formed a flat knob 42 or, in the alternative, a "match head" shaped knob 42' for the purpose of retaining tiles 18 in position when shaft 20 is inserted in the interstices 34 between pillow elements 12. Pillow elements 12 are supported on projections 44 extending from a base support 36. Surrounding the perimeter of pillow elements 12 in FIG. 4 is a frame, not shown but similar to frame 14 shown in FIG. 7, thereby to retain pillow elements 12 in a tightly packed arrangement while allowing shafts 20 and the attached tiles 18 to be shifted from one interstice 34 to another.

Figure 6:
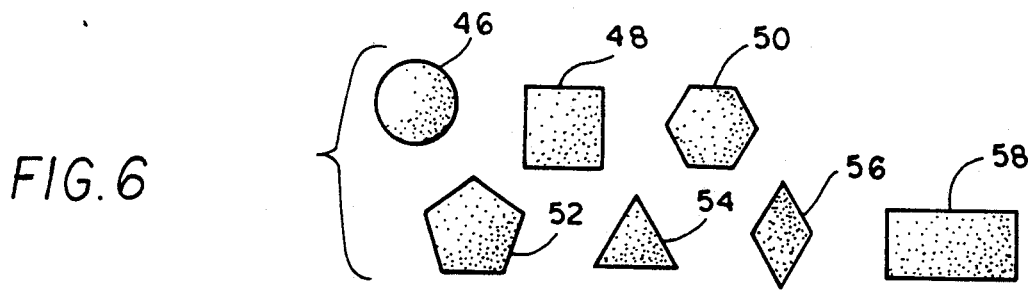
FIG. 6 is a view showing a plurality of different pillow configurations.
Figures 7A, 7B:
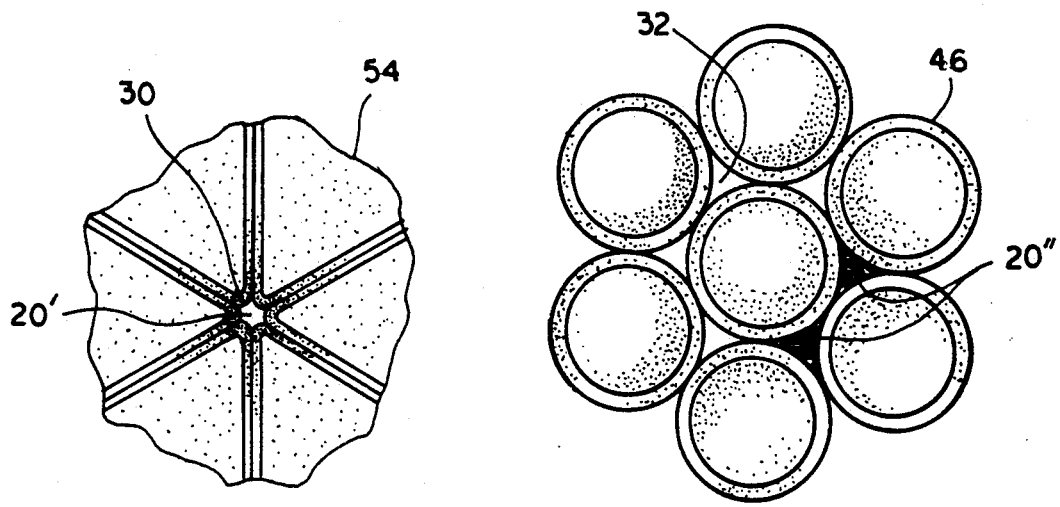
FIG. 7A is a top view showing an interstice formed between pillow elements having a triangular configuration.
FIG. 7B is a top view showing interstices formed with pillow elements having a cylindrical configuration.

FIG. 6 shows a number of different possible configurations of pillow 12, including but not limited to a circle 46, square 48, hexagon 50, pentagon 52, triangle 54, diamond 56 and rectangle 58.

FIGS. 10-14, inclusive, suggest possible uses for the inventive enabling assembly. In FIG. 10, there is shown a sign 64 suitably mounted on a wall 66, formed of a frame 14 enclosing pillow elements 26 holding tiles 18 having alphanumeric characters 22 thereon, whereby a message is conveyed to a reader. The tiles 18 may be rearranged or interchanged with other tiles 18 to change the message. Opening or through passage 68 in each pillow 26 permits air to pass through the sign 64, thereby allowing for greater stability and less wind damage to the sign 64.

In FIG. 11, enabling assembly 10 is formed as a supporting arch with such things as a light 70 and/or a flowerpot 72 attached to hooks 60 of tiles 18 by a cord 74 or the like. Wall portions 76 may be substituted for frame 14' in this arrangement, but the unit would be generally pre-assembled in a frame 14'.

In FIG. 12, an enabling assembly formed of frame 38 and pillow elements 12 is used for support of facing materials such as sheathing 78, the sheathing 78 being provided with shaped projections 80 designed to be inserted into interstices 34 and to be held thereby. Projections 80 may end in a "match head" shaped knob 62 if desired.

FIG. 13 shows enabling assembly 10 used as a room divider 82. By using tiles such as tiles 18 decorated with a variety of colors and/or shapes and/or designs or sheathing 78 the patterns on both sides of divider 82 may be changed whenever desired.

In FIG. 14, enabling assemblies 10 may be used to form a temporary building 84 having by way of example only, a curved roof 86 which may be weatherproofed using elastic sheathing.

Other uses can include children's games and puzzles wherein the object is to shift tiles and the like from one location to another, for example, to change the design or visual appearance of a surface or both surface in the case of a double-sided unit.

The enabling assembly allows for portable units comprising many linked and movable pieces without risk of loss or severe disarrangement, the units being virtually unlimited in size and shape. Damaged or inappropriate parts can be changed very readily. Pieces are readily demountable and portable in crates, cartons or bags. The assembly can form a load-bearing structure when correctly shaped, framed, mounted, charged with fluid or pressurized. Pillow elements may be divisible for stacking.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

We claim:

1. An enabling assembly comprising:
   a plurality of resilient pillow means;
   each of said plurality of resilient pillow means having two ends;
   each of said plurality of resilient pillow means having sides with interlocking ogee or S curves intermediate said ends thereof;
   each of said plurality of resilient pillow means being placed adjacent a respective adjacent one of said plurality of resilient pillow means;
   each of said plurality of resilient pillow means forming an interstice with each of said respective adjacent one of said plurality of resilient pillow means;
   facing means, each having at least one projection, being mounted on said plurality of resilient pillow means; and
   a frame means surrounding the perimeter of said plurality of resilient pillow means to hold said plurality of resilient pillow means in interlocking fashion.

2. The enabling assembly according to claim 1, wherein said facing means comprises a plurality of tile means;
   each tile means including a shaft means insertable in said interstices between said pillow means;
   said shaft means being slidable between said pillow means from one interstice to another interstice; and
   said frame means including a plurality of parking slot means, whereby one or more tile means may be selectively moved to a parking slot means thereby providing a space within said frame means enabling other tile means to be moved from one interstice to another.

3. The enabling assembly according to claim 2, wherein said tile means are double-faced to provide a face on each side of said frame means, said faces being connected by said shaft means.

4. The enabling assembly according to claim 3, wherein said tile faces have portions of a design thereon;
   said design being changeable by selectively sliding said tile means from one interstice to another.

5. The enabling assembly according to claim 4, wherein said design includes alphanumeric characters.

6. The enabling assembly according to claim 2, wherein said tile means include a face tile disposed on one end of said shaft means;
   a knob on the end of said shaft means opposite said one end;
   a base support means having projection means thereon connected to said frame means; and
   said projection means supporting said pillow means while enabling said shaft means to move from one interstice to another interstice.

7. The enabling assembly according to claim 1, wherein said facing means comprises sheathing means.

8. The enabling assembly as in claim 1 wherein the frame means further comprises a retaining frame means and a mating interlocking frame means;
   said retaining frame means being placed on a top surface of said plurality of resilient pillow means;
   said mating interlocking frame means enclosing said plurality of resilient pillow means;
   said interlocking frame means including an ogee or S curve corresponding to the ogee or S curves on said pillow means.

9. The enabling assembly as in claim 1 wherein said frame means comprises an interlocking frame means including an ogee or S curve corresponding to the ogee or S curves on said pillow means;
   said interlocking frame means being located adjacent one of said sides of some of said plurality of resilient pillow means;
   said interlocking frame means also being located adjacent one of said ends of some of said plurality of resilient pillow means, whereby said interlocking frame means forms a frame around said plurality of resilient pillow means.

10. The enabling assembly according to claim 1, wherein said pillow means are formed from a resilient material having a low coefficient of friction.

11. The enabling assembly, according to claim 10, wherein said pillow means are formed of nylon.

12. The enabling assembly according to claim 10, wherein said pillow means are formed as resilient hollow means.

13. The enabling assembly according to claim 10, wherein said pillow means are formed as resilient hollow collars.

14. The enabling assembly according to claim 10, wherein said pillow means are hollow at least in part; and
   fluid introducing means are mounted on said pillow means enabling the introduction of fluid to increase weight and pressure exerted on said pillow means to thereby stabilize and strengthen said assembly.

15. The enabling assembly according to claim 1, wherein said frame means of said assembly is curved to form a supporting arch means;
   said facing means providing a knob means; and cord means being attached to said knob means, whereby articles may be hung from said supporting arch means by said cord means.

16. The enabling assembly according to claim 1, wherein said frame means of said assembly is curved to form a dome roof means for a temporary building.

17. The enabling assembly according to claim 1, wherein said assembly is disposed vertically enabling a room to be divided;

said facing means having interchangeable patterns thereon; and said interchangeable pattern enabling a user to redecorate said room by shifting said facing means.

* * * * *